United States Patent [19]
Whitchurch et al.

[11] Patent Number: 5,635,815
[45] Date of Patent: Jun. 3, 1997

[54] BATTERY EXERCISING PACER AND/OR EMERGENCY START MONITORING SYSTEM

[75] Inventors: Norton W. Whitchurch, 2830 18th St. NW., New Brighton, Minn. 55112; James Thayer, Fridley, Minn.

[73] Assignee: Norton W. Whitchurch, New Brighton, Minn.

[21] Appl. No.: 371,366

[22] Filed: Jan. 11, 1995

[51] Int. Cl.$^6$ .................................................. H02J 7/10
[52] U.S. Cl. ............................... 320/21; 320/20; 320/14; 320/35
[58] Field of Search .................. 320/2, 5, 30, 35, 320/14, 21, 22–24, 31, 32, 39, 40, 37, 38, 36, 122

[56] References Cited

U.S. PATENT DOCUMENTS

| | | |
|---|---|---|
| 1,126,670 | 1/1915 | Wilson . |
| 2,342,929 | 2/1944 | Fletcher ................................. 320/5 |
| 2,366,505 | 1/1945 | Fletcher ............................... 320/14 |
| 2,456,978 | 12/1948 | Medler ................................. 320/14 |
| 2,503,179 | 4/1950 | Tichenor ............................... 320/14 |
| 2,619,624 | 11/1952 | Briggs, Jr. ............................ 320/14 |
| 2,853,862 | 5/1958 | McNutt ................................. 320/14 |
| 2,935,675 | 5/1960 | Ferguson et al. ....................... 320/4 |
| 3,293,445 | 12/1966 | Levy ................................... 307/66 |
| 3,500,167 | 3/1970 | Applegate et al. ..................... 32/14 |
| 3,517,293 | 6/1970 | Burkett et al. ....................... 320/14 |
| 3,535,608 | 10/1970 | Cramer et al. ........................ 320/14 |
| 3,597,673 | 8/1971 | Burkett ............................... 320/14 |
| 3,603,861 | 9/1971 | Staats et al. ........................ 320/14 |
| 3,857,087 | 12/1974 | Jones ................................ 324/29.5 |
| 4,385,269 | 5/1983 | Aspinwall et al. .................... 320/14 |
| 4,413,221 | 11/1983 | Benjamin et al. ..................... 320/48 |
| 4,731,573 | 3/1988 | Sexton et al. ....................... 320/14 |
| 4,742,289 | 5/1988 | Wahlstrom ........................... 320/14 |

Primary Examiner—Aditya Krishnan
Attorney, Agent, or Firm—Moore & Hansen

[57] ABSTRACT

A battery pacer apparatus and method are configured for extending the life of lead-acid batteries. A high current discharge is applied for a limited time of about 10–40 seconds to remove lead sulphate deposits on the electrodes. Following discharge, the battery is fully recharged. The pacing discharge is initiated at least about once daily by a timing circuit. During the pacing discharge, the battery voltage is measured. A decrease in battery voltage to below a preset non-steady state failure value is indicative of imminent battery failure, setting off an alarm enabling replacement or servicing before the battery fails in service.

27 Claims, 6 Drawing Sheets

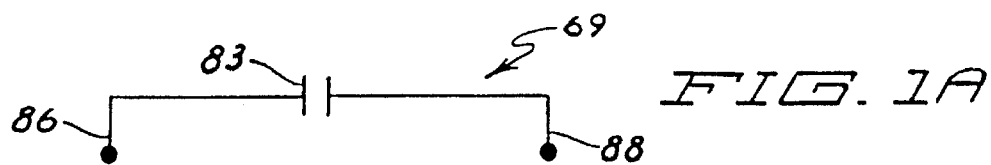
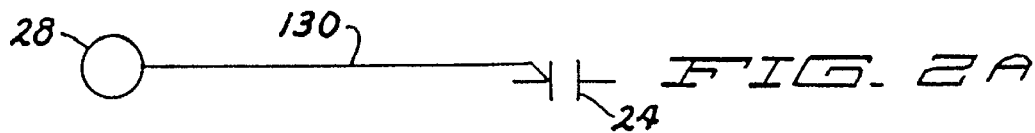
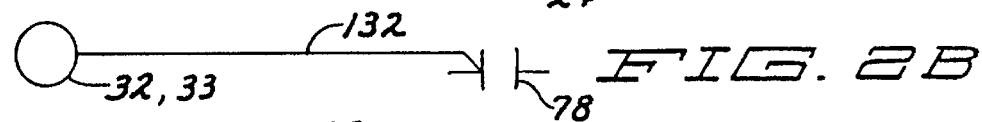
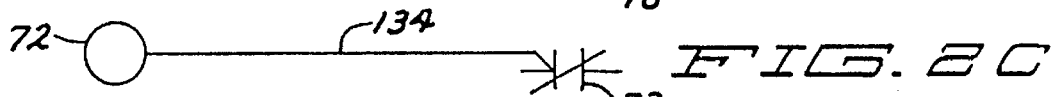
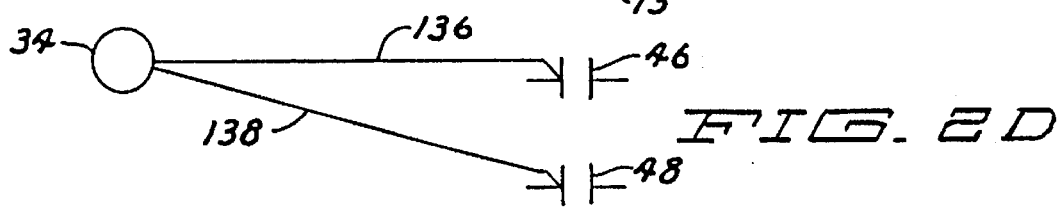
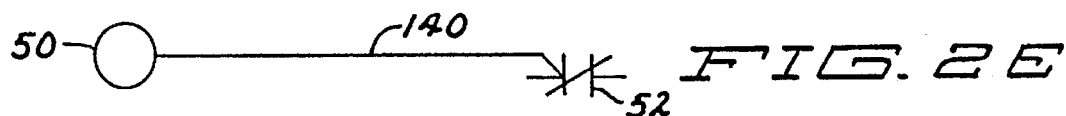
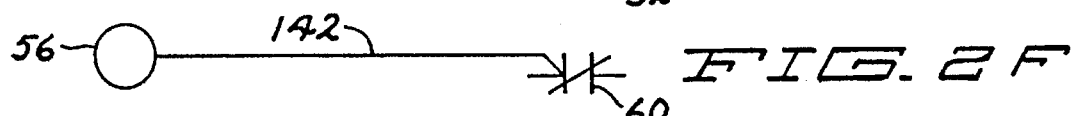
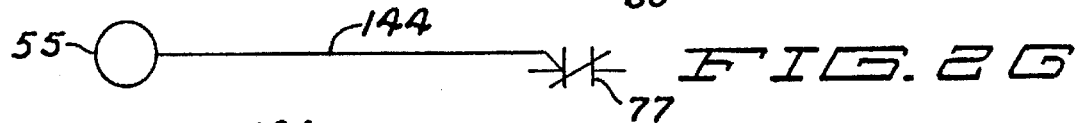
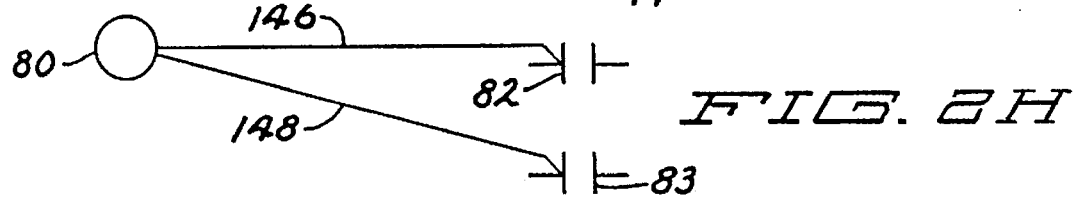
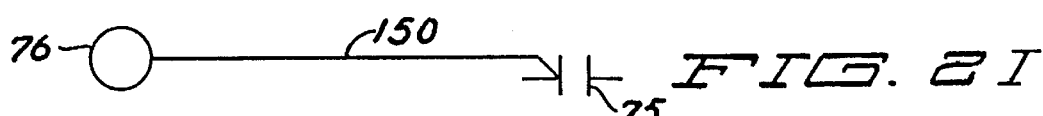
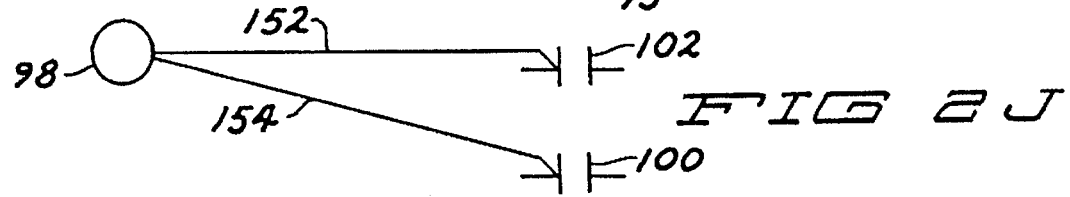
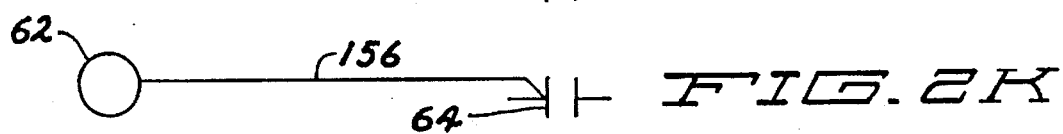

BATTERY EXERCISING PACER AND/OR EMERGENCY START MONITORING SYSTEM

BACKGROUND OF THE INVENTION

This invention relates generally to the maintenance of batteries. More particularly, this invention pertains to an apparatus and method for enhancing the life of rechargeable lead-acid storage batteries and indicating when the battery requires servicing or replacement.

A conventional lead-acid storage battery of the type used for motor vehicles often fails when not used frequently. Thus, for example, while automobile lead-acid batteries under frequent use may typically last 4–6 years, the same batteries used in boats often fail after storage over a single winter season, even when kept fully charged. It is known that during periods of inactivity, excessive quantities of lead sulphate form on the internal plates. The solid lead sulphate acts as an effective electrical insulator to prevent high current densities in either a discharge or charge mode. In addition, the particle size of the precipitated lead sulphate may be so large that complete reversal to lead or lead oxide and sulphuric acid does not occur upon recharging. Thus, the battery may be useless for high current uses such as starting engines, etc.

Failure of batteries during storage has also been partially attributed to the storage conditions. Typically, the battery is stored on a cold basement or garage floor. Even though the battery is kept fully charged, the internal temperature difference, from top to bottom, is exacerbated by standing on the cold floor, and may result in rapid battery deterioration.

Complete or nearly-complete discharge of lead-acid batteries often leads to an early demise. In addition, excess discharge in a cold climate may lead to freezing of the electrolyte, with attendant cracking of the electrodes and battery case.

The propensity to battery failure is not simply a result of excessive discharge. Premature failure often results even when the battery is maintained at a high charge level with a "trickle charger" for example, and is not permitted to be deeply discharged. The premature failure is due to excessive accumulation of lead sulphate.

In many situations, storage batteries are subjected to long periods of inactivity. Examples of such include 24 volt battery banks for starting emergency generators in hospitals, defense works, remote microwave communications installations, remote water and sewage pumps, and the like. Battery failure in such instances may result in loss of property and/or communications, or even life, for example, in a hospital situation.

Similarly, batteries used for starting boat and motorcycle motors, or operating small trolling motors, typically have a very short life. The short life is often attributed to long term winter storage without frequent charging, but premature battery failure is well known to occur even when the battery charge is maintained.

Any method for extending the life of lead-acid batteries will not only reduce the cost of replacement, but will reduce secondary costs related to battery failure.

The conventional method for testing a battery is to determine whether the battery will accept and maintain a full charge voltage for a short period of time. Thus, a nominal 12 volt lead-acid battery may be considered to be in acceptable condition if it will accept a charge of e.g. about 11 to 12.5 volts and no significant drop in voltage occurs upon standing for a period of several hours following the charging cycle.

It has been found that the propensity to fail is not generally detectable by measuring the voltage across the fully charged battery, presumably because such no-load voltage is not significantly related to the degree of lead sulphate plating with its resulting increase in internal resistance. Even though commonly used, the inadequacy of this test is well-known and calls for an improved test procedure, particulary where the intended useful current load on the battery may be relatively high.

Lead-acid batteries are typically rated in several ways. First, the term "cold-cranking amperage" refers to the battery capacity, in ampere-hours, when discharged at a rate which will draw it down to a given cell voltage in five minutes.

However, the most common measurement of storage battery capacity is the five-hour rating, obtained by discharging the battery at a rate which will discharge it in five hours. The five-hour rating will always be much higher than the five-minute rating which more closely approximates the use of the battery in an engine starting situation.

The term "reserve capacity" refers to the additional capacity in amperes at which a battery potential of 10.5 volts is maintained. In this rating, time is not strictly taken into account. Obviously, if even a small load is placed on a battery, it will in time drop below 10.5 volts, and will eventually be entirely depleted, i.e. zero volts potential.

An apparatus and method for both extending battery life and determining when the battery is in an impending failure mode will greatly increase the effectiveness, reliability and safety of lead-acid batteries.

BRIEF SUMMARY OF THE INVENTION

The primary object of this invention is to provide apparatus and methods for significantly extending the useful life of rechargeable storage batteries.

A related object is to provide an apparatus and method for preventing the premature failure of a lead-acid storage battery due to the formation of a thick layer of an insoluble salt on the surfaces of the internal electrodes.

A further object is to provide a testing means and method which determine whether the battery will provide adequate starting power for an internal combustion engine or the like, and indicate a defective battery.

An additional object is to provide an apparatus which accomplishes such life-extending operations and tests without discharging the battery to a non-usable state. Emergency operations require the battery to be ready for immediate use at any time to start a generator motor, for example.

It has been discovered that premature failure of storage batteries may largely be overcome by discharging a high current load from the battery for a period of about 10–40 seconds, typically one to three times each day. At other times during the day, the battery is connected to a charger for restoring and maintaining the battery in a fully charged condition. The term "pacing" is used to conceptually describe the method by which timed periodical high-load discharging operations are conducted. The operations simulate relatively frequent engine start-ups to avoid the periods of inactivity common to storage batteries.

The invention comprises a pacing method and device which utilize a timer to periodically connect the battery across a low resistance load for a period of about 10–40 seconds at a controllable frequency of about once every other day to multiple times per day. Following each pacing discharge, a charging device is activated to restore and maintain the full charge of the battery.

The discharge amperage load for pacing is preferably configured to approximate the actual useful load, e.g. starter motor of an internal combustion engine, etc. but is always of the order of at least 0.1 amperes per cold cranking ampere rating of the battery. Thus, for example, a pacing discharge of at least about 150+ amperes will be typically applied to a nominal 1000 cold cranking ampere battery.

While the mechanics of the method are not fully understood, it is believed that the high discharge shocks the plates to remove the buildup of lead sulphate therefrom and to permit reversal of the precipitation reaction.

In any case, the pacing discharge period is only of the order of about 10–40 seconds, so that the battery still retains sufficient capacity at the end of the pacing period to be immediately available for its intended purpose, if required.

To be most effective, the pacing operations are conducted at an average rate of at least about once per day, although a higher or lower number of pacing discharges may be conducted daily. It is believed that the optimum number of pacing discharges is about 1–3 per day, based on extending the useful battery life as long as possible.

The pacing circuit is, with the exception of the battery charger, entirely energized by the battery and operable at the normal battery voltage.

In a further feature of the invention, the condition of the battery for its installed purpose may be simultaneously determined by measuring the battery potential during the pacing discharge period or during a secondary discharge which approximates the actual useful load. A secondary discharge may be used where the useful load current is considerably less than the most effective pacing load, for example.

A defective battery or low electrolyte level, etc. is indicated by a battery potential which falls below a preset minimum value during the non-steady state discharge operation. The minimum potential value is preset with a safety factor so that the battery still retains sufficient capacity for a limited number of uses, e.g. until it can be serviced or replaced. Thus, for example, the minimum potential value of a nominal 24 volt, 1000 ampere-hour battery bank may be set at 20.0 volts when using a 200 ampere pacing discharge for 30 seconds. In such a system, when the pacing voltage falls below 20.0, an alarm sounds and/or a visual signal is displayed which indicates that the battery requires servicing or replacement. Although the primary cause of a low pacing voltage is the excessive accumulation of lead sulphate, other events e.g. low electrolyte level may also result in a low voltage. Such events may normally be handled by conventional servicing of the battery.

These and other objects and advantages of the invention will be readily understood by reading the following description in conjunction with the accompanying figures of the drawings wherein like reference numerals have been applied to designate like elements throughout the several views.

BRIEF DESCRIPTION OF THE DRAWINGS

FIG. 1A is a schematic view of a remote alarm indication circuit of the invention;

FIG. 2A is a schematic view of a solenoid and a connected switch of a circuit of the invention;

FIG. 2B is a schematic view of a relay and a connected switch of a circuit of the invention;

FIG. 2C is a schematic view of a relay and a connected switch of a circuit of the invention;

FIG. 2D is a schematic view of a timeclock and connected switches of a circuit of the invention;

FIG. 2E is a schematic view of a relay and a connected switch of a circuit of the invention;

FIG. 2F is a schematic view of a disconnecting relay and a connected switch of a circuit of the invention;

FIG. 2G is a schematic view of a safety relay and a connected switch of a circuit of the invention;

FIG. 2H is a schematic view of a lock-on relay and connected switches of a circuit of the invention;

FIG. 2I is a schematic view of a time delay relay and a connected switch of a circuit of the invention;

FIG. 2J is a schematic view of a control relay and connected switches of a circuit of the invention;

FIG. 2K is a schematic view of a voltage sensing relay and a connected switch of a circuit of the invention;

DESCRIPTION OF THE PREFERRED EMBODIMENTS

Figure 1:
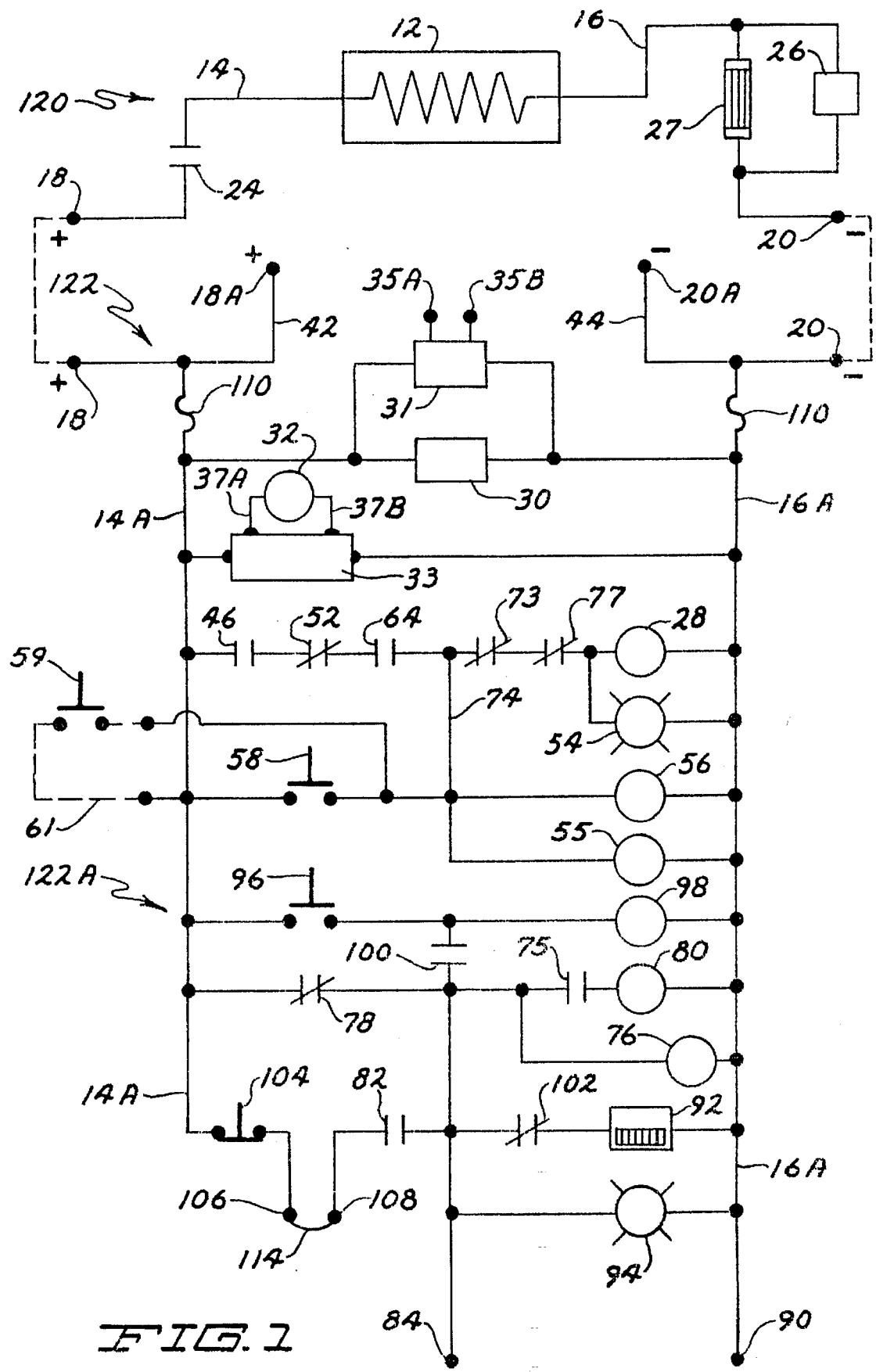
FIG. 1 is a schematic view of a low voltage circuit of a battery pacer of the invention.
Figure 2:
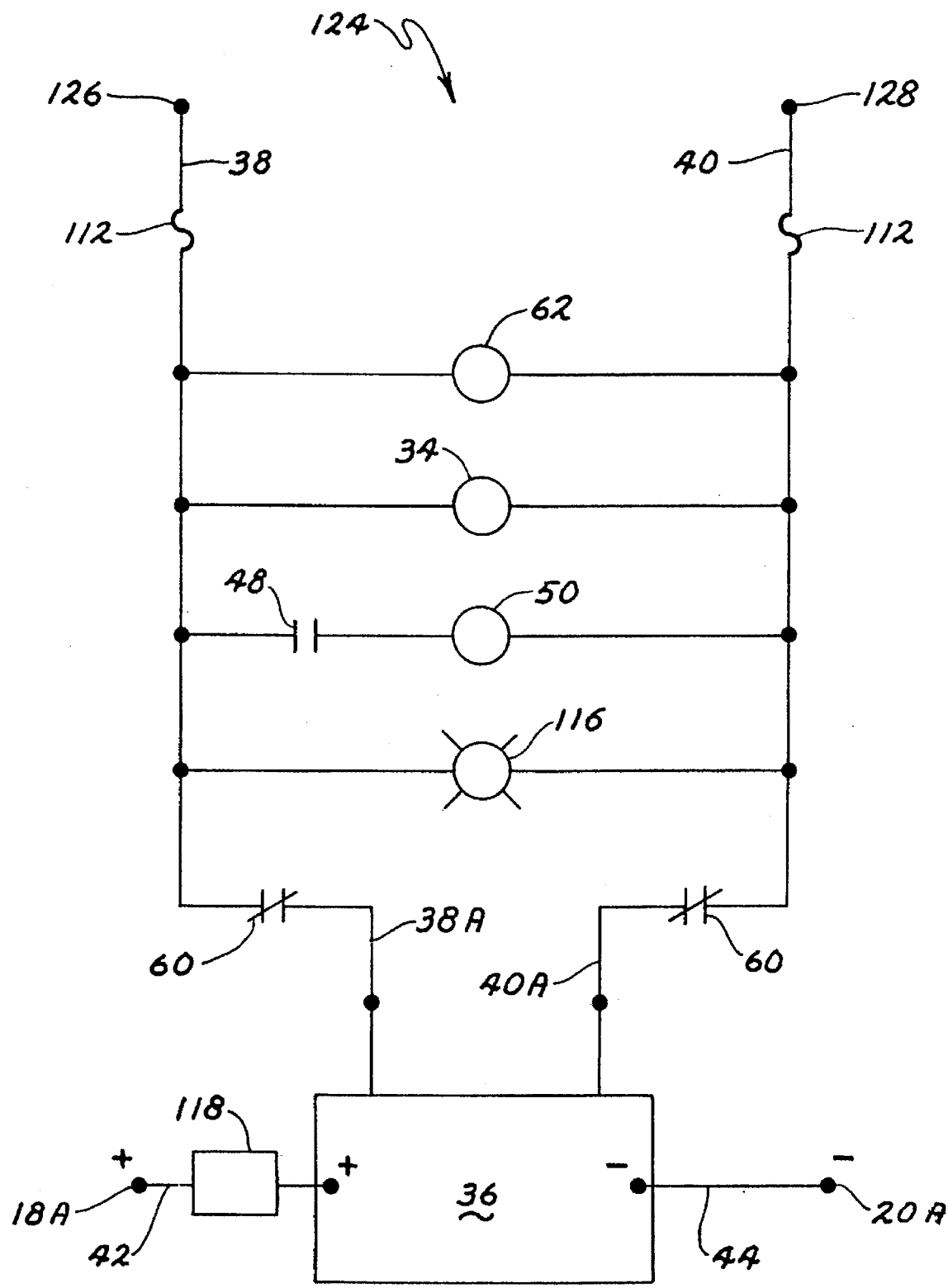
FIG. 2 is a schematic view of a line voltage alternating current circuit of the invention which controls the battery charger operation.

With reference to the drawings, and particularly to FIGS. 1 and 2, a battery pacer 10 of the invention is presented in schematic form. The pacer 10 includes a low voltage load circuit 120, a low voltage control circuit 122 and a high voltage circuit 124, the latter optionally including a battery charger.

Figure 5:
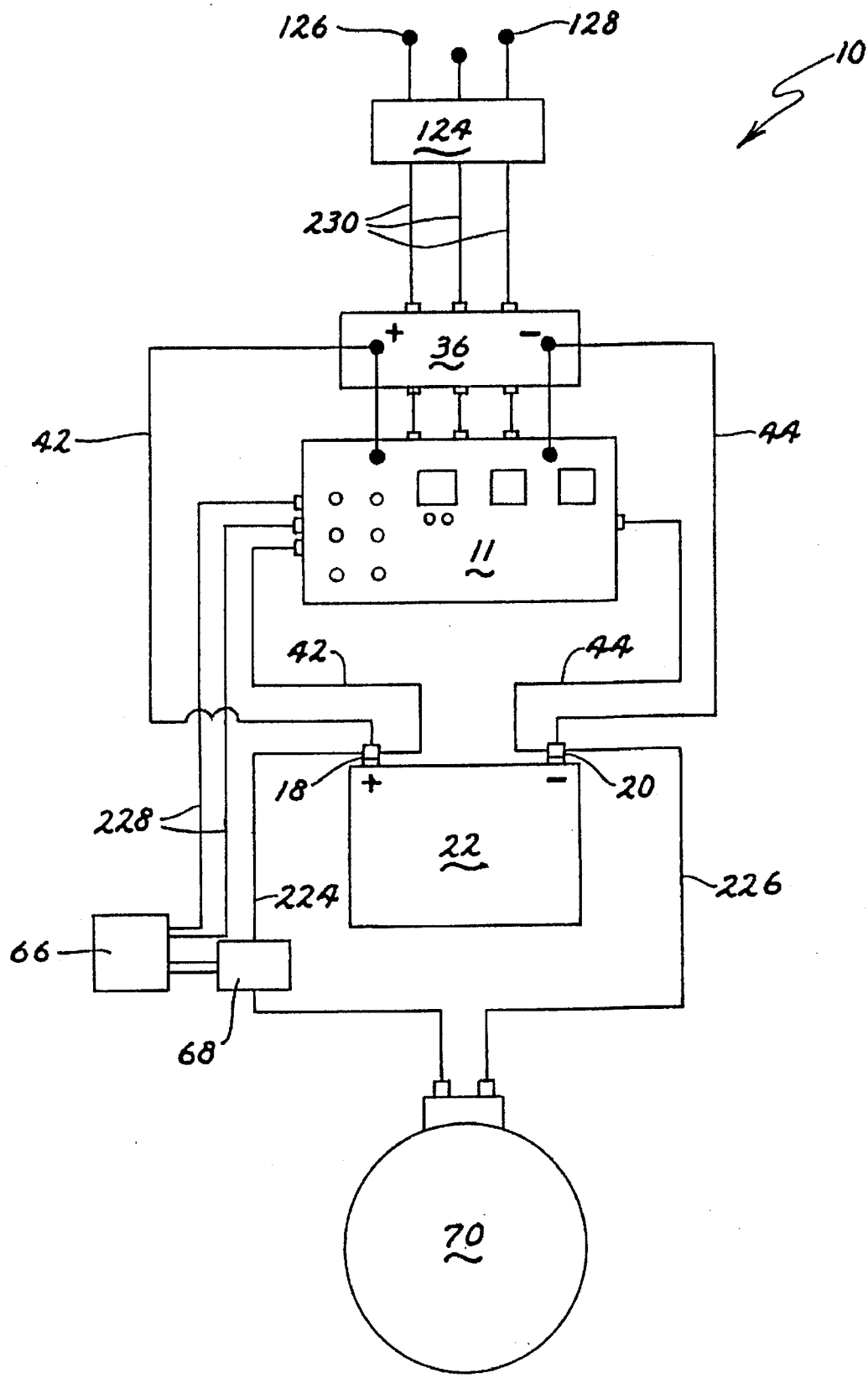
FIG. 5 is a schematic view of the battery pacer, charger, battery, useful load and load controller of the invention.

The load circuit 120 includes a resistance load 12 connected through conduits 14, 16 to the opposing positive terminal 18 and negative terminal 20 of a battery 22 (see FIG. 5). For purposes of illustration, the battery 22 is assumed to be a 24 volt lead acid battery such as is commonly used to start diesel engines. Such batteries typically have a capacity of about 1000 or greater (up to about 3000) "cold cranking amperes". A switch 24 is shown in conduit 14 for closing the circuit between the battery terminals 18 and 20 through the resistance load 12. An ammeter 26 with an associated parallel shunt 27 is shown in conduit 16 for measuring the discharge current when switch 24 is closed.

Low voltage control circuit 122 has common positive side 14A and common negative side 16A. Sides 14A and 16A are preferably connected directly to the positive and negative battery terminals 18 and 20, respectively, as to be minimally affected by potential losses in circuits 14, 16 during high current flow test periods. A Switch 24 is activated by a starting solenoid 28 operating at the potential of the battery 22, e.g. 24 volts DC. The switch 24 is configured to pass a high current which in the preferred embodiment approximates the maximum current drawn from battery 22 in starting an engine to which it is attached. For this battery, the switch 24 may be rated at 200 amperes at 24 volts DC, for example.

Also shown connected across the battery terminals 18 and 20, through sides 14A, 16A, is a potential meter or DC voltmeter 30 which measures the potential across the battery 22. The meter 30 is useful for local observation. Optionally, a transducer 31 may be used to convert the potential across the battery 22 to a 4–20 milliamp, 0–1 milliamp or other desired signal via terminals 35A, 35B for indication/control from e.g. a computer terminal. This is particularly useful for remote reading/control, and this and other signals from the pacer 10 may be transmitted by use of telephone lines, microwave transmission, or via geosynchronous orbit satellite, for example.

As shown in FIG. 1, an undervoltage meter relay 32 measures the difference between the full charge voltage and the voltage during the pacing period. For use with exemplary 24 volt batteries 22, the undervoltage meter relay 32 may be adjustable from 16 to 30 volts. As long as the measured voltage across meter relay 32 is greater than a preset value, the relay 32 holds normally closed alarm switch 78 open so that a non-alarm condition is indicated. Although undervoltage meter relay 32 may be used to directly close alarm switch 78 upon measuring a predetermined undervoltage, the circuit 122 is shown with a solid state low voltage detector 33 which provides a signal through conduits 37A and 37B to relay 32 for closing switch 78, to which the relay 32 is connected. The solid state low voltage detector 33 will be further described in the discussion of FIG. 3.

A battery charger 36 appropriate to the battery capacity is shown connected to the battery terminals 18 and 20 through conduits 42, 44 and terminals 18A and 20A, for restoring and maintaining the battery 22 at full charge. The battery charger 36 is shown powered by a nominal 120 VAC line current through conduits 38A and 40A (compare FIGS. 1 and 2).

In series with solenoid 28 between side 14A and side 16A are normally open time clock switch 46, normally closed time delay switch 52, normally open voltage sensing switch 64, normally closed load run switch 73 and normally closed safety switch 77.

Time clock 34 (FIG. 2) may be a 24 hour time clock with 12 hour intervals, settable to close time clock switch 46 (FIG. 1) at preset times to activate the pacing function. Time clock switch 48 (FIG. 2) is also activated at the same time by the time clock 34, thus activating time delay relay 50.

Time delay switch 52 may be set to open following a delay of e.g. 3–30 seconds, after being activated by high voltage time delay relay 50. The set time of relay 50 determines the time period during which the battery is rapidly discharged in the pacing operation. The normally open voltage sensing switch 64 (FIG. 1) is normally powered by high voltage relay 62 (See FIG. 2) to maintain it in a closed position. Should the line voltage fail for any reason, relay 62 loses power and voltage sensing switch 64 automatically opens to prevent any further pacing discharging of the battery 22. Without line power, the charger 36 is, of course, inoperable to recharge the battery 22.

The normally closed load run switch 73 is activated by load sensing relay 72 (FIG. 2C) which is connected to the useful load 70, e.g. the start-and-run circuit of an engine. The relay 72 remains energized as long as the engine is running, preventing undue discharge of the battery 22.

When switches 46, 52, and 64 are closed, circuit 74 is energized to provide power to time delay safety relay 55. Relay 55 includes a time delay which is set at a time exceeding the normal pacing time, and is connected to safety switch 77 to open it if discharging of the battery 22 continues for any reason after the preset pacing discharge period as determined by relay 50. Where the preset discharge period is set at e.g. 30 seconds, the safety relay 55 may be set to open switch 77 after about 36 seconds, thus preventing the battery 22 from being excessively discharged during the pacing.

Energization of circuit 74 also activates disconnecting relay 56, which is connected to normally closed charger switch(es) 60 (see FIG. 2). Thus, when the pacing discharge is in progress, charger switches 60 are open to maintain the battery charger 36 in an OFF condition.

The low voltage load circuit 120 may be activated at times other than called for by time clock 34 by activation of normally open push-button type test switch 58 to initiate the pacing discharge. Also shown in FIG. 1 is an optional normally open remote test switch 59 in a circuit 61 for activating the load circuit 120. Switch 59 may be activated via telephone or telemetering, as is known in the art.

A pilot light 54 is connected in parallel with starting solenoid 28 to conveniently indicate when the solenoid 28 is energized and the pacing discharge is in progress.

When the time delay of relay 50 is completed, relay 50 activates time delay relay switch 52, thereby opening it to deenergize starting solenoid 28, halting the pacing discharge. The circuit 120 returns to its normal non-discharging mode, and time clock 34 begins to count down toward the next pacing discharge. The battery charger 36 is activated to recharge the battery 22.

The low voltage control circuit 122 includes a battery analyzer and alarm subcircuit 122A as shown in FIG. 1.

It has already been indicated that the undervoltage meter relay 32 and/or solid state low voltage detector 33 determines, during a pacing discharge operation, when the battery voltage falls below a preset value indicative of a battery which requires attention. Undervoltage meter relay 32 may, for example, comprise a relay which acts to close undervoltage alarm switch 78 if the voltage falls to a preset value indicative of a battery problem. Typically, the preset value of relay 32 or indicator 33 may be adjusted to any value between 16 and 30 volts. When an indication of undervoltage occurs, closing switch 78, lock-on relay 80 is actuated to close normally open lock-on switch 82, thus maintaining the alarm circuit ON until deliberately shut off. The lock-on relay 80 maintaining the alarm in an "ON" position even if the battery voltage rises to a non-alarm value, to confirm that an alram condition has occurred.

Of course, closure of undervoltage alarm switch 78 activates alarm horn 92, alarm light 94 or other alarm indicator through terminals 84 and 90, calling attention to the battery 22 which requires servicing or replacement.

Lock-on relay 80 may also activate a remote alarm, not shown, through conduits 84 and 90 or 86 and 88. When conduits 84 and 90 are used to provide remote indication, the battery 22 supplies the transmission power. As indicated in FIG. 1A, an alternative remote alarm indication circuit 69 includes a lock-on switch 83 at a remote location which provides a closed circuit through conduits 86 and 88 to the switch of a powered alarm, not shown. The signal from lock-on relay 80 to lock-on switch 83 may be via telephone, telemetry, or other means as known in the art, to close switch 83 during an alarm, i.e. undervoltage condition.

In a preferred form of the alarm subcircuit 122A, a normally open time delay switch 75 is connected in series with lock-on relay 80 and is activated by time delay relay 76 which is connected between conduit 84 and side 16A. The relay 76 has a time delay function which is adjustable to provide a delay in activation of relay 80. Typically, a short adjustalble time of about 0.5 to 5 seconds is used, preventing a breakaway surge current from setting off the alarm simply because a pacing discharge has begun.

An alarm silencing switch 96 is wired in series with silencing control relay 98, between sides 14A and 16A, to prevent shutting off the audible horn 92 without shutting off the alarm light 94. Switch 96 and normally open switch 100 are connected in series between side 14A and conduit 84. Also, switch 78 is connected between side 14A and conduit 84. In addition, manual normally closed reset switch 104 (which may be a push button switch), jumper 114 and normally open lock-on switch 82 are connected in series between side 14A and conduit 84.

Alarm silencing switch 96 is normally open, and may be closed to actuate control relay 98 which closes switch 100 to maintain electrical power to red alarm light 94. Of course, relay 98 also opens normally closed switch 102 to silence the alarm horn 92. Normally closed reset switch 104 is opened to reset the alarm circuit to a non-actuated configuration.

If desired, the alarm subcircuit 122A may be reset remotely by removing jumper 114 and connecting terminals 106 and 108 to a remote switch, not shown, which may be similar or identical to reset switch 104.

When the reset switch 104 is opened, power to the lock-on relay 80, horn 92 and red alarm light 94 is cut off. Switches 96 and 104 may be manual push button switches.

The low voltage control circuit 122 is shown with protective fuses 110 of e.g. 10 ampere rating, between sides 14A, 16A and the respective battery terminals 18, 20.

As depicted in FIG. 2, The line voltage circuit 124 includes each of timeclock 34, voltage sensing relay 62, and pilot light 116 in its own conduit between the alternating current conduits 38 and 40. In addition, time delay relay 50 is connected in series with switch 48 between conduits 38 and 40.

FIG. 2 also shows a battery charger 36 which is powered by line conduits 38 and 40 and has outlet terminals 18A and 20A of outlet conduits 42 and 44, respectively. The terminals 18A and 20A are connected to the terminals 18, 20 respectively (see FIG. 1). An ammeter 118 is shown in conduit 42 for visual observation of the charging rate. As known in the art, the charger 36 may be set to shut off at a "full charge" voltage, or may be set to provide a low "trickle charge" when the battery is fully charged. The charger 36 may be a commercial off-the-shelf unit connected into the pacing circuit, or may be specially constructed to be an integral part of the battery pacer 10.

The line voltage control circuit 124 is shown with protective fuses 112 in conduits 38, 40 to protect the circuit elements from excessive current draw. Conduits 38, 40 have terminals 126, 128, respectively which are connected to AC line voltage, e.g. 120 VAC.

In FIGS. 2A through 2K, the signal conduits from the various signal initiators, i.e. relays, solenoids and timeclock, to the respective switches, are shown. Each of signal conduits 130, 132, 134, 136, 138, 140, 142, 144, 146, 148, 150, 152, 154 and 156 is indicated.

Figure 3:
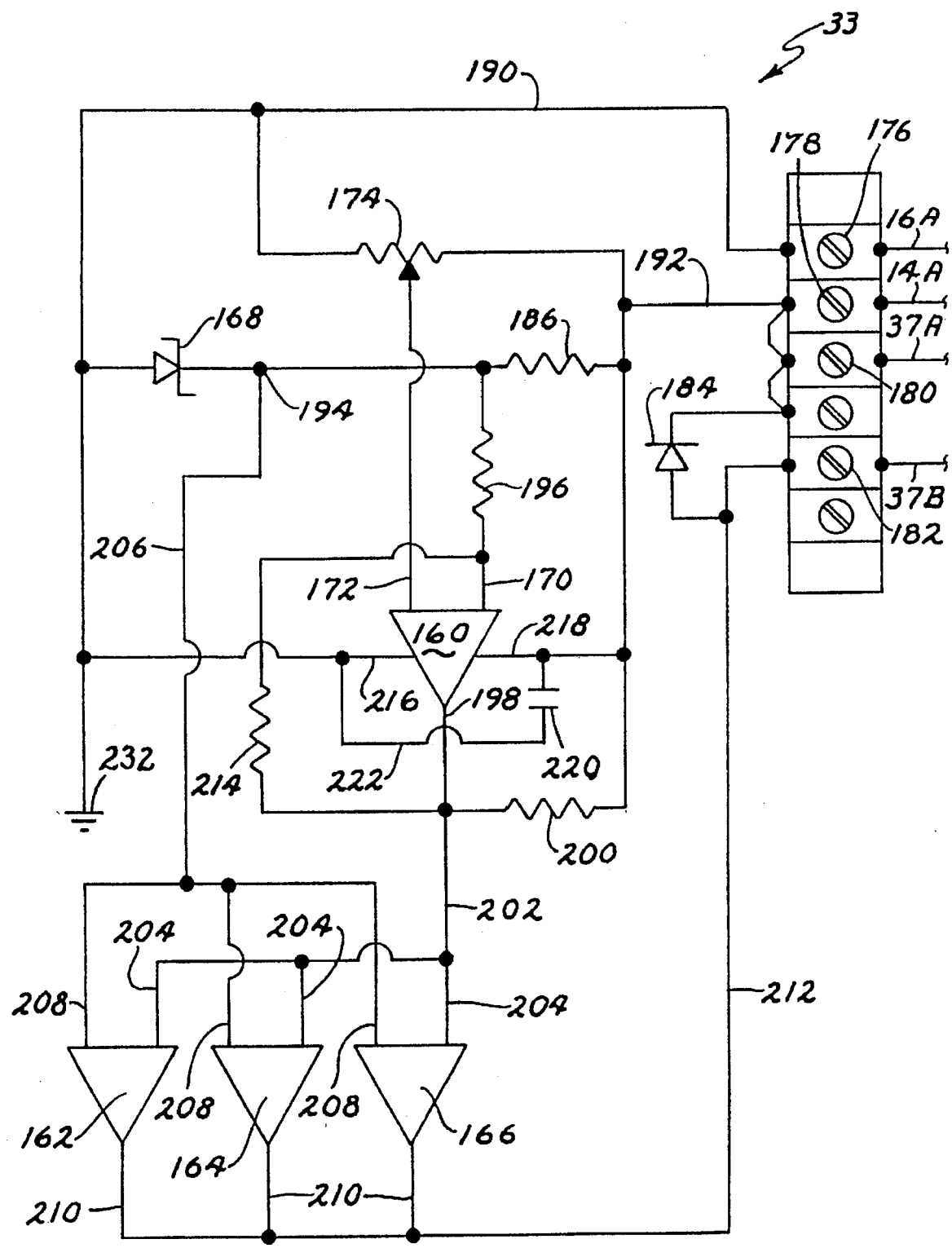
FIG. 3 is a schematic view of a solid state voltage sensing circuit of a low voltage detector of the invention.

FIG. 3 shows the circuit of a solid state low voltage detector 33 which has been found to be very useful in the pacer 10. The detector 33 is shown with terminal 176 which is connected to the negative battery terminal 20 through side 16A and to ground 232 through conduit 190. Terminal 178 is connected to positive battery terminal 18 through side 14A. Terminal 180 is connected to undervoltage relay coil 32 through conduit 37A. Terminal 182 is connected to undervoltage relay coil 32 through conduit 37B.

A diode 184 between terminals 180 and 182 permits one-way current therebetween and may be for example a common IN4007 diode.

The detector 33 utilizes a plurality e.g. four quad comparators 160, 162, 164 and 166 to provide the necessary current to the undervoltage meter relay 32. An exemplary comparator which may be used is the LM339 quad bipolar comparator which is available from Motorola Company as a unitary molded ceramic device. As is well known, the quad comparator comprises a transisterized circuit, and compares the electrical potential of two signals to determine whether one signal is higher or lower than the other signal in potential. When the voltage applied at inverting input is greater than the voltage applied to the non-inverting input, an NPN transister of the comparator is ON, i.e. conducting. Comparators 162, 164 and 166 are connected in parallel as shown, to provide the necessary current required by the undervoltage relay meter 32.

A zener diode 168 is connected in series with resistance 186 between terminal 176 and terminal 178, through conduits 190 and 192. The diode 168 produces a constant voltage at its positive terminal 194, and through resistance 196 produces a constant reference voltage at non-inverting input pin or terminal 170 of the first quad comparator 160. This reference voltage is set at a value designated herein as a "failure" voltage which for a 24 volt battery may be set at 19–20 volts.

At inverting input pin or terminal 172, a constant fraction of the battery potential is applied by setting adjustable resister 174. The voltage value is preset so that it equals the "failure" reference voltage at first pin 170 when the battery attains a condition of near-failure during a timed pacing discharge. During a pacing discharge, if the battery voltage in conduit 190 falls to the point where the voltage at pin 172 falls below the reference voltage at pin 170, the output transister within the comparator 160 becomes non-conducting. The voltage at pull-up resister 200 then goes to a high value which through conduit 202 is transmitted to non-inverting pins 204 of the three comparators 162, 164 and 166. A constant voltage is fed from the zener diode 168 via conduit 206 to the inverting pins 208. As long as the inverting input voltage at pins 208 is greater than the non-inverting input voltage at pins 204, the output pins 210 of comparators 162, 164 and 166 are conducting to power the undervoltage switch 78, keeping switch 78 open. When the conduit 202 has the high value indicated above, the inverting input voltage at pins 208 is less than the non-inverting input voltage at pins 204, and the output pins 210 are unpowered. No signal flows through conduit 212 to power the switch 78, and it closes to sound the alarm.

As shown in FIG. 3, conduit 202 is connected through resister 214 to pin 170, and through resister 200 to the positive battery terminal 18. Comparator 160 has power pins 216 and 218 connected to the negative and positive battery terminals 20 and 18, respectively. An external conduit 222 between pins 216 and 218 contains a capacitor 220 in parallel with first comparator 160.

The output conduit 212 and positive pole 18 of the battery 22 are connected through a diode 184 to permit one-way current flow.

The low voltage detector 33 is preferably formed as a printed circuit.

The pacing of a battery 22 may be done on an automatic timed basis and/or be manually activated whenever desired. As shown in FIGS. 1 and 2, a timeclock 34 may be set to activate a signal at a particular time. For example, the timeclock 34 may be a 24-hour, seven day clock set to turn on switch 46 twice daily. The timeclock signal also initiates, through switch 48, a time delay relay 50 which maintains time delay switch 52 closed for a predetermined pacing period, for example 20 seconds. Thus, starting solenoid 28 is activated to close switch 24. Activation of disconnecting relay 56 opens switch 60 to disconnect the battery charger 36 from the battery 22.

Normally closed switch 52 opens after a preset time, typically 10–40 seconds, to terminate the pacing period. The system resets itself for recharging by the charger 36.

For convenience of the operator, a pilot light 54 is shown which is lit to indicate pacing of the battery 22.

It should be noted that the pacing operation need not occur each and every day to be effective. It is important, however, that over the useful lifetime of the battery, the pacing discharge and subsequent charge be conducted at an average rate of about once per day, or more often, to achieve the best results. Lesser benefits may be obtained by pacing less frequently, and diminishing improvements typically occur when pacing is conducted more frequently than about once daily.

A further feature of the invention is a voltage sensing relay 62 connected between the 120 VAC conduits 38 and 40. If a loss of line voltage should occur during a pacing period, relay 62 opens switch 64 to terminate the pacing period and reset the switches to the non-pacing positions. Thus, undue discharging of the battery 22 will not occur when line voltage for subsequently recharging the battery is not available. Furthermore, the relay 62 prevents the pacing discharge from continuing beyond the desired preset time period, should normal power fail.

Shown schematically in FIG. 5 is a load controller 66 which controls switch 68 for applying DC current from battery 22 through conduits 224, 226 to a useful load 70 e.g. a diesel engine starter. Also shown is conduit 228 which carries a signal from the load controller 66 to a load sensing relay in pacer 10 (see FIG. 1). This signal opens a switch 73 (see FIG. 1) to stop a pacing discharge operation if underway, or prevent it from occurring. Thus, high load pacing and normal discharge of the battery 22 will not occur simultaneously. In FIG. 5, the battery pacer 10 includes the DC circuits 120, 122, 122A and undervoltage detector 33 of FIGS. 1 and 3, all shown in unit 11, as well as the line AC circuit 124 of FIG. 2. A battery charger 36 is controlled to provide timed charging of battery 22 through conduits 42 and 44. The various conduits between unit 11, AC circuit 124, and charger 36 are represented by conduits 230.

It is indicated in the above discussion that various relays are used to open and close switches in both the AC and DC portions of the circuit. Unitary relay-switch combinations are commercially available and may be advantageously used in the invention.

The method of pacing a lead-acid battery which is accomplished by the above described apparatus includes the steps of:

(a) halting the charging of the battery, by turning off the charger or disconnecting the charger from the battery, if one is connected;

(b) applying a current drawing pacing load to the battery, wherein the load approximates the normal useful load, for a period of 10–40 seconds. The pacing load preferably draws a current P in amperes which is related to the maximum cold cranking capacity C, amperes of the battery by: P/C=at least about 0.10, and preferably about 0.15 or more;

(c) halting the current drawing pacing load to the battery at the end of the pacing period; and (d) recharging the battery to a fully charged condition.

In accordance with the invention, the condition of the battery undergoing pacing is determined by measuring the voltage during the pacing period. A preset value PV of failure voltage is selected which is characteristic of a battery which is close to failing but which has sufficient capacity for one or more additional uses. For example, the preset value PV of failure voltage for an automotive 12 volt battery may be set at 10.0 volts. Similarly, the preset value PV for a 24 volt diesel engine application is typically about 19–20 volts.

Figure 4:
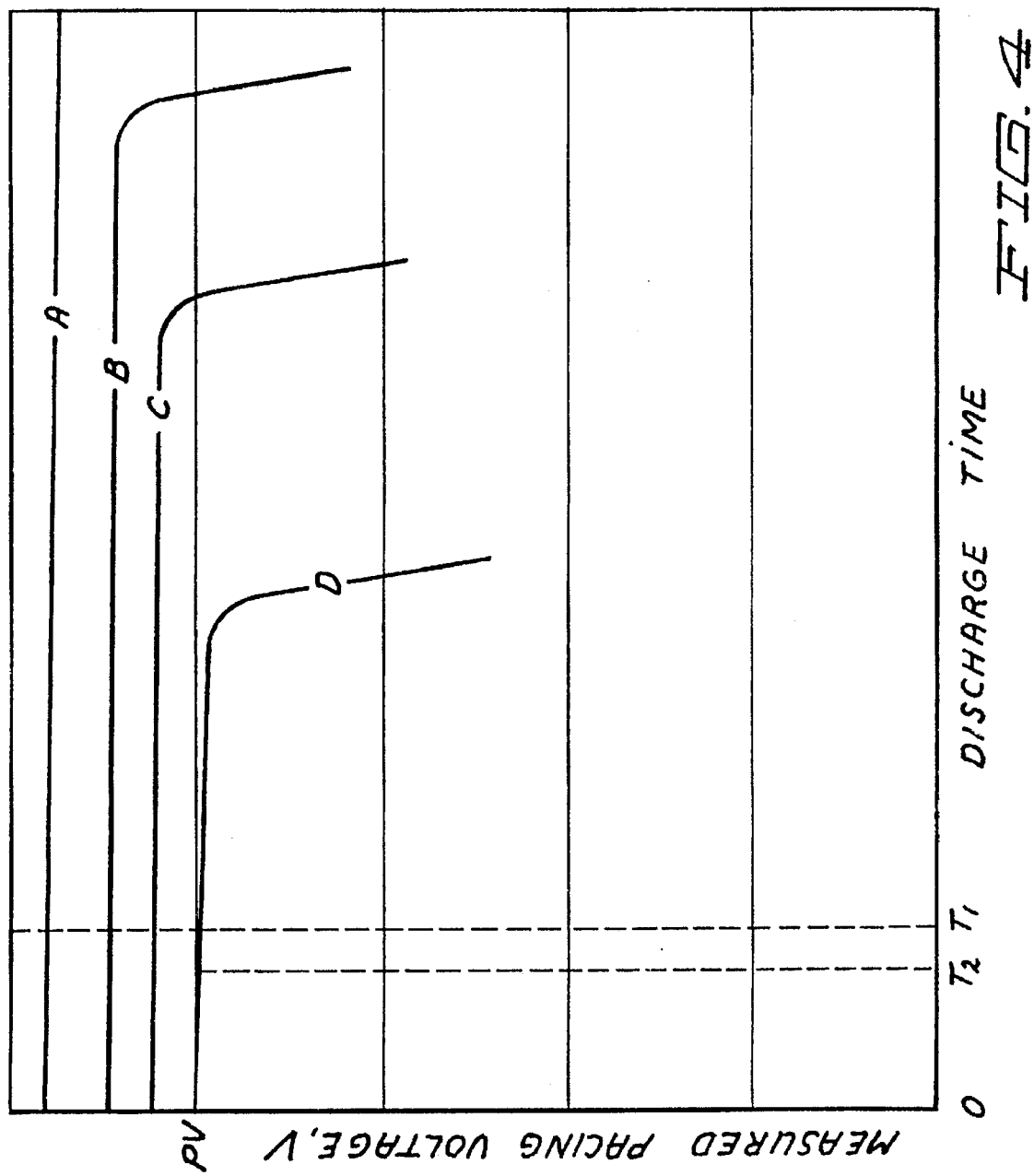
FIG. 4 is a graphical depiction of exemplary battery voltage curves during the pacing discharge period as defined by the invention.

As shown in FIG. 4, line A represents the voltage across a fully charged new battery to which a pacing load is applied for a pacing period $T_1$. The line is extended beyond the pacing period to show the change in voltage if discharge were to be continued beyond the pacing period. The voltage slowly decreases as a function of time but does not fall below the preset value PV indicative of a battery requiring servicing or replacement until the discharging has continued for a time period significantly longer than pacing period T1. Under continued discharge, the voltage across the battery terminals will eventually drop to zero as the battery becomes totally discharged. The short pacing period results in only a limited degree of battery discharge, however, unless the battery capacity is in a greatly deteriorated condition. Lines B, C, and D represent the voltage under discharge conditions across batteries of increased degrees of deterioration. In line D, the battery voltage during pacing falls below preset value PV at time $T_2$, indicating that the battery requires replacement or servicing. The battery of line D typically has sufficient capacity for several uses, e.g. diesel engine startups, before it becomes totally useless for the application. The preferred preset value PV of failure voltage is determined from the known battery discharge curves to provide the desired safety factor. In FIG. 4, the initial voltage (at zero time) is indicated to decrease as the battery approaches failure. For example, line D starts at a lower voltage than line A. This is not necessarily true in real life, however, where the initial battery voltage is affected by other factors In one form, the battery charger 36 is always disconnected from the battery 22 during the pacing discharge operation. In another form, the AC line voltage is disconnected from the charger 36 during pacing.

Because of the relative infrequency of the pacing operations, the pacer may advantageously be used to pace a plurality of batteries at spaced intervals. A timer may be used to sequence the multiple battery pacing through a series of relays and switches.

Where a battery is used in an application having a relatively low current rate, the most effective pacing discharge may be considerably higher than the current draw during actual use. In such cases, the pacing discharge may be carried out at the higher current rate, and the measurement discharge carried out at a lower current rate approximating the useful load. In this situation, two different resistance loads are used sequentially based on the timeclock 34.

Use of the pacer apparatus results in several major benefits. First, the useful life of the battery is significantly extended, reducing battery replacement expense. Secondly, the extended life results in far fewer inconvenient and/or expensive episodes which occur as a result of battery failure. When combined with the battery evaluation procedure, use of the pacing method and apparatus enables determination of an imminent battery failure before it occurs, so that proper steps can be taken to service or replace the battery. The pacing operations may be conducted remotely so that personnel are not normally required at the operation site.

The pacing apparatus and method of the invention may be adapted for lead-acid batteries of any number of cells, i.e. any voltage and any current capacity.

While either of the pacing discharge function and the battery condition determination may be conducted without the other, the combination is particularly advantageous because they occur simultaneously and automatically, not requiring any manual operations unless the battery is found to be faulty.

EXAMPLE

A long-term test of the method was carried out over a nine year period, using a pair of 12 volt "diesel starting" CATERPILLAR batteries connected in series. This is the typical configuration used for stationary diesel powered standby electric plants with a standard starting rolling current of 200 amperes. The batteries used were each rated at 1000 cold cranking amperes. The typical lifetime of such batteries when maintained in a storage condition by a "trickle" charger is about 2–4 years.

The battery bank was placed on a cold basement floor in August, 1980 to simulate actual storage of such batteries in a situation conducive to enhanced temperature differential and accelerated deterioration.

A charging/discharging circuit having some features of that of FIG. 1 was connected to the battery. The circuit required manual activation of each pacing discharge, and included an indicator/alarm which was set to sound an alarm and light a lamp at any time that the battery bank voltage dropped to 19.0 volts. The control apparatus included a "silencer" button which turned off the sound alarm but left the lamp lit until manually shut off.

In June, 1981, the control circuit was modified with a timer to automatically start and stop each pacing action at the desired frequency.

During the test duration, the battery was periodically paced with a partial discharge and subsequent recharge in accordance with the invention as follows:

Start of Test Period: August, 1980

End of Test: December 12, 1989

Frequency of discharge: 2 pacing discharges/day, i.e. a discharge every 12 hours.

Discharge amperes: 200 amperes

Discharge period: 20 seconds per discharge

Preset minimum voltage to activate alarm: 19.0 volts

Recharging: Following each pacing discharge, the battery was fully recharged with a commercial battery charger. The charging current ranged from about 5 amperes to a lower value, sufficient to approach total recharge within about 20 minutes following the pacing discharge.

The condition of the battery bank was also tested at each pacing discharge event by the method of the invention. During the period between August 1980 and December 12, 1989, the measured voltage during the pacing period always exceeded the preset 19.0 volts, and the batteries remained in good operating condition. On December 12, 1989, the 20 seconds of pacing dropped the measured voltage to below 19.0 volts for the first time, initiating the alarm. The battery bank was calculated to have sufficient capacity at this time for at least several starts of a diesel engine, i.e. 200 amps for about 15 seconds, before complete failure.

Thus, the pacing operations conducted on these batteries extended the battery life by a factor of about 2.5 to 4. The battery test method provided an alarm which indicated that the batteries were close to a failure condition. The batteries had sufficient capacity, following the alarm activation, to yet be usable for one or more projected engine start-ups.

It is anticipated that various changes and modifications may be made in the construction, arrangement, operation and method of construction of the battery pacer disclosed herein without departing from the spirit and scope of the invention as defined in the following claims.

What is claimed is:

1. A pacer for maintaining and extending the life of a rechargeable battery having a capacity of C cold cranking amperes, comprising:

a resistance circuit for periodic connection to the battery for partial discharge thereof at a current rate in amperes of at least 0.1 times the capacity C;

first timing means to periodically initiate said partial discharge about one to three times daily; and second timing means to terminate said partial discharge after a predetermined period between about 10 and 40 seconds.

2. A pacer for maintaining and extending the life of a rechargeable battery, comprising:

a resistance circuit for periodic connection to said battery for partial discharge thereof at a rate approximating the intended maximum instantaneous discharge rate of the battery during use;

first timing means to periodically initiate said partial discharge;

second timing means to terminate said partial discharge after a predetermined period between about 10 and 40 seconds; and voltage sensing means for sensing said battery voltage during said partial discharge and actuating a signal when said voltage drops below a preset value indicative of a reduced battery capacity.

3. The pacer of claim 2, wherein said preset value is indicative of a reduced battery capacity characteristic of imminent battery failure.

4. The pacer of claim 2, further comprising a manual initiation circuit for initiating the partial discharge at times other than initiated by said first timing means.

5. The pacer of claim 2, further comprising:

means for connecting a charging circuit to said battery; and a switching means for activating said charging circuit when said partial discharge is not occurring and deactivating said charging circuit when said partial discharge is initiated.

6. The pacer of claim 5, wherein said switching means activates and deactivates said charging circuit by activating and deactivating the primary line power to the charging circuit.

7. The pacer of claim 5, wherein said switching means activates and deactivates said charging circuit by closing and opening a switch controlling the low voltage current flow from the charger to the battery.

8. The pacer of claim 5, further comprising a battery charger having a charging circuit connected to said battery.

9. The pacer of claim 2, wherein said voltage sensing means comprises an undervoltage relay actuatable by a battery voltage value greater than a presettable undervoltage value representative of a battery in imminent failure to maintain a normally closed undervoltage switch in an open position, whereby a battery voltage less than said presettable undervoltage value actuates said undervoltage relay to close said undervoltage switch for initiating an alarm.

10. The pacer of claim 9, wherein said voltage sensing means comprises a comparing circuit including a plurality of quad bipolar comparators connected in parallel, said comparing circuit providing a current to activate said undervoltage relay when said battery voltage is greater than said presettable undervoltage value to maintain said undervoltage switch in an open position, and wherein a battery voltage less than said presettable undervoltage value produces a loss of current to said undervoltage relay.

11. The pacer of claim 2, further comprising sequencing means for partially discharging a plurality of rechargeable batteries in timed sequence.

12. The pacer of claim 2, wherein said pacer is configured for maintaining and extending the life of a lead-acid battery.

13. The pacer of claim 2, wherein said resistance circuit provides for a pacing discharge rate in amperes equal to at least about 0.1 times the battery cold cranking capacity in amperes.

14. The pacer of claim 2, wherein said resistance circuit provides for a pacing discharge rate in amperes equal to at least about 0.15 times the battery cold cranking capacity in amperes.

15. A method for pacing a lead-acid battery having a given ampere-hour capacity rating to extend its useful life, comprising:

(a) determining the instantaneous useful electrical load to be placed on a lead-acid battery;

(b) applying an electrical current load approximating said useful electrical load across said battery and discharge said battery for a selected preset time period of about 10 to 40 seconds;

(c) disconnecting said applied load from said battery;

(d) connecting said battery across a charging circuit and fully charging said battery; and (e) repeating steps (b) through (d) with an average frequency of at least once per day.

16. The method of claim 15, comprising the further steps following step (b) of:

(bb) determining the actual potential value across the battery terminals during the discharge time period;

(bbb) presetting a discharge potential value indicative of an imminent battery failure;

(bbbb) comparing said actual potential value with the preset discharge potential value; and (bbbbb) providing a signal when said actual potential value is lower than the preset discharge potential value.

17. The method of claim 15, wherein said applied current load in amperes is equal to at least about 0.1 times the cold cranking battery capacity in amperes.

18. The method of claim 15, wherein said applied current load in amperes is equal to at least about 0.15 times the cold cranking battery capacity in amperes.

19. A battery pacer, comprising:

a resistance and first switch for series connection across a battery;

a battery charger connected across said battery for charging thereof;

a first relay for series connection with a first NC timeclock switch, a first normally closed time delay switch, a line voltage sensing switch, load sensing switch, and a safety relay switch across said battery;

a timeclock settable to activate said timeclock switch at desired time intervals;

a second time delay switch actuated by said timeclock;

a time delay relay controllable by the position of said second time delay switch to actuate said first time delay switch for opening thereof following a time delay comprising a pacing discharge period;

a line voltage sensing relay for opening said line voltage sensing switch when line voltage fails;

an load sensing relay for opening said load sensing switch when said normal useful load is operating;

a safety time delay relay for delaying the closing of said safety relay switch upon closure of said first timeclock switch, first time delay switch and line voltage sensing switch;

a disconnecting relay in series with said first timeclock switch, first time delay switch and line voltage sensing switch across said battery, for turning off said battery charger upon closure of said first timeclock switch, first time delay switch and line voltage sensing switch; and an undervoltage sensing circuit and alarm circuit for determining when the battery voltage is lower than a preset voltage value and activating an undervoltage alarm switch.

20. The pacer of claim 19, further comprising a first manual switch in parallel with said first timeclock switch, first time delay switch and line voltage sensing switch, said first manual switch activatable to initiate said pacing discharge.

21. The pacer of claim 20, further comprising means for activating said first manual switch from a remote location.

22. The pacer of claim 19, wherein said undervoltage sensing circuit comprises a low voltage detector having a plurality of quad bipolar comparators which detect a battery voltage lower than a preset voltage value and signal an undervoltage relay to activate an undervoltage alarm switch.

23. The pacer of claim 22, wherein said undervoltage alarm circuit comprises:

a reset switch and lock-on switch in series with a secondary alarm switch and an alarm; and a normally closed undervoltage alarm switch normally maintained in an open position by power from said undervoltage sensing circuit and closed thereby when said battery voltage drops below said preset voltage value, said undervoltage alarm switch in series with a secondary alarm switch and an alarm for activating said alarm, said undervoltage alarm switch in series with a lock-on relay to close a lock-on switch maintaining said alarm ON until said reset switch is opened.

24. The pacer of claim 23, further comprising an alarm silence switch activatable to shut off said alarm.

25. The pacer of claim 23, further comprising means for remote indication that the alarm is ON and OFF.

26. The pacer of claim 23, further comprising a remote reset switch for resetting the alarm indicating circuit to a reset condition.

27. The pacer of claim 23, wherein said alarm comprises an audible signal and a visual signal, said pacer further comprising an alarm silence switch activatable to silence said audible signal without shutting off said visual signal.

* * * * *